United States Patent
Boscaino et al.

(10) Patent No.: US 11,648,743 B2
(45) Date of Patent: *May 16, 2023

(54) APPARATUS FOR APPLYING NOISE REDUCER ELEMENTS TO TYRES FOR VEHICLE WHEELS

(71) Applicant: PIRELLI TYRE S.P.A., Milan (IT)

(72) Inventors: Ivan Gildo Boscaino, Milan (IT); Albert Berenguer, Milan (IT); Cristiano Puppi, Milan (IT); Gianni Mancini, Turin (IT)

(73) Assignee: PIRELLI TYRE S.P.A., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 17/810,056

(22) Filed: Jun. 30, 2022

(65) Prior Publication Data

US 2022/0332069 A1    Oct. 20, 2022

Related U.S. Application Data

(63) Continuation of application No. 16/633,574, filed as application No. PCT/IB2018/054738 on Jun. 27, 2018, now Pat. No. 11,440,278.

(30) Foreign Application Priority Data

Jul. 28, 2017    (IT) .......................... 102017000086952

(51) Int. Cl.
*B29D 30/00* (2006.01)
*G01N 21/84* (2006.01)

(52) U.S. Cl.
CPC ...... *B29D 30/0061* (2013.01); *G01N 21/8422* (2013.01); *G01N 2021/845* (2013.01); *G01N 2021/8427* (2013.01)

(58) Field of Classification Search
CPC ............ B29D 30/0061; B29D 30/0016; B29D 30/00; G01N 21/8422; G01N 2021/8427; G01N 2021/845; G01N 21/95
See application file for complete search history.

(56) References Cited

U.S. PATENT DOCUMENTS

| 2003/0067597 | A1* | 4/2003 | Ashimoto | .......... G01N 21/8914 356/237.1 |
| 2007/0251621 | A1* | 11/2007 | Prost | ...................... B60C 23/20 152/209.1 |
| 2011/0203741 | A1* | 8/2011 | Seitz | ................... G01M 17/024 157/1.17 |

(Continued)

*Primary Examiner* — David P Porta
*Assistant Examiner* — Gisselle M Gutierrez
(74) *Attorney, Agent, or Firm* — Steinfl + Bruno LLP

(57) ABSTRACT

A process and apparatus for applying noise reducer elements to tyres. Each noise reducer element has an anchoring surface coated with an adhesive layer. The anchoring surface is illuminated with a reference radiation. The radiation emitted by the anchoring surface is detected; and a digital image representative of the anchoring surface is determined as a function of the emitted radiation. Each pixel of the digital image is associated with a respective brightness value representative of the amount of adhesive present in an area of the anchoring surface corresponding to such each pixel. One or more noise reducer elements are applied on the radially inner surface of a tyre.

14 Claims, 5 Drawing Sheets

(56) References Cited

U.S. PATENT DOCUMENTS

Figure 1:
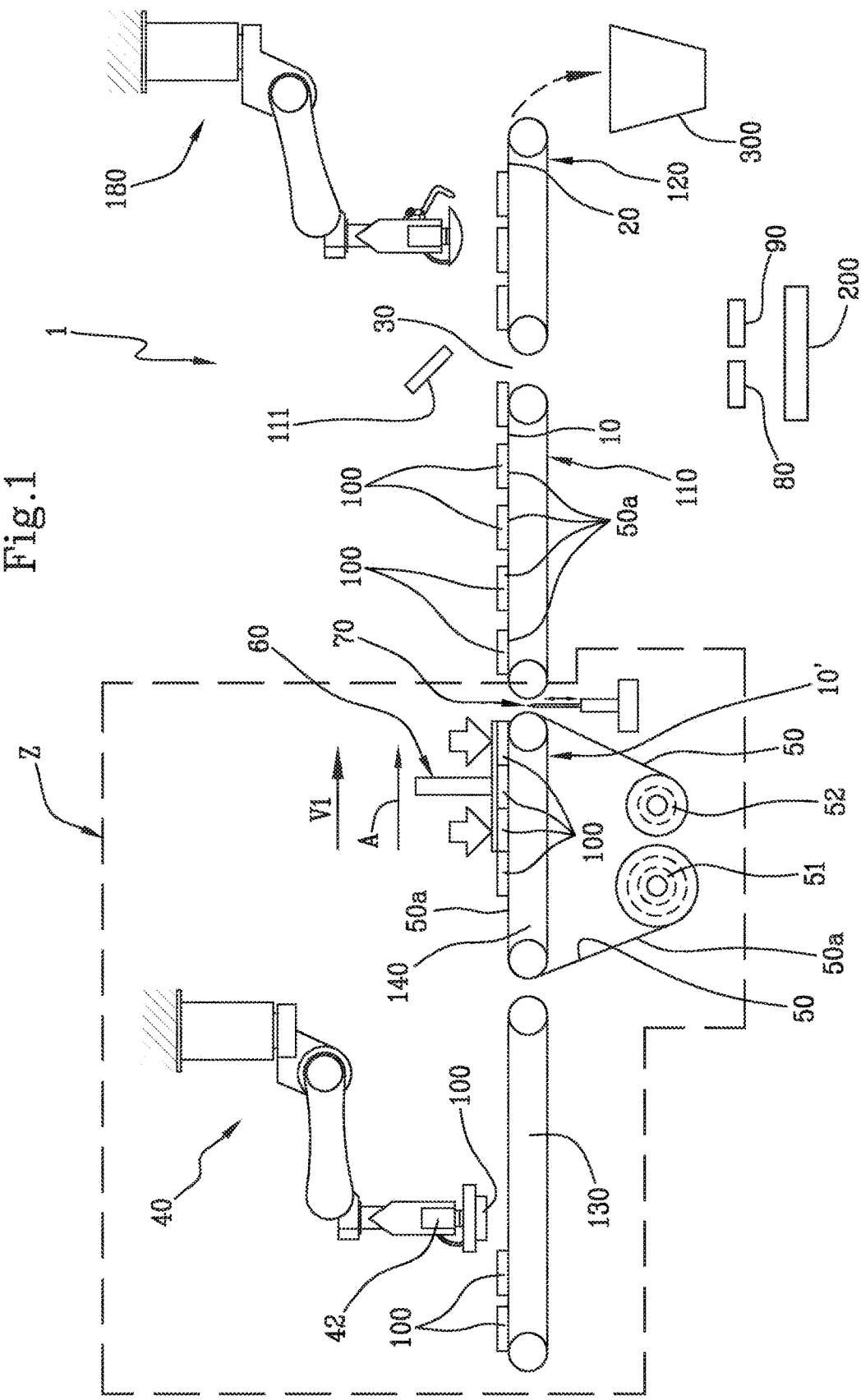

| | | | |
|---|---|---|---|
| 2012/0012237 A1* | 1/2012 | Beaugrand | B29D 30/1628 |
| | | | 156/117 |
| 2016/0282277 A1* | 9/2016 | Tixier | G01N 21/31 |
| 2016/0320265 A1* | 11/2016 | Regoli | G01M 17/027 |
| 2017/0106616 A1* | 4/2017 | Marchini | B29D 30/36 |
| 2018/0111427 A1* | 4/2018 | Seo | B60C 1/00 |
| 2018/0318888 A1* | 11/2018 | Matsumura | B23K 26/0823 |

* cited by examiner

APPARATUS FOR APPLYING NOISE REDUCER ELEMENTS TO TYRES FOR VEHICLE WHEELS

CROSS REFERENCE TO RELATED APPLICATIONS

The present application is a continuation application of Ser. No. 16/633,574 which is the U.S. National Stage of International Patent Application No. PCT/162018/054738 filed on Jun. 27, 2018 which, in turn, claims priority to Italian Application No. 102017000086952 filed on Jul. 28, 2017. The contents of each which are incorporated herein by reference in their entirety.

BACKGROUND OF THE INVENTION

The present invention relates to a process and an apparatus for applying noise reducer elements to tyres for vehicle wheels.

The expression "noise reducer element" is used for indicating an element that, once associated with a tyre for vehicle wheels, has the capacity of attenuating the noise produced by the tyre during use. Such capacity is preferably conferred to the aforesaid noise reducer element by the type of material with which the aforesaid element is made. A material suitable for such purpose is for example a sound-absorbent material, such as open-cell polyurethane foam.

A tyre for vehicle wheels generally comprises a carcass structure comprising at least one carcass ply formed by reinforcement cords incorporated in a matrix of elastomeric material. The carcass ply has end flaps respectively engaged with anchoring annular structures. The latter are situated in the zones of the tyre normally identified with the term "beads" and each is normally formed by a substantially circumferential annular insert on which at least one filler insert is applied, in radially outer position. Such annular inserts are commonly known as "bead cores" and have the task of maintaining the tyre firmly fixed to the anchoring seat suitably provided in the rim of the wheel, thus preventing, during operation, the exit of the radially inner end flap of the tyre from such seat.

At the beads, specific reinforcement structures can be provided having the function of improving the transmission of torque to the tyre.

In radially outer position with respect to the carcass structure, a crown structure is associated.

The crown structure comprises a belt structure and, in radially outer position with respect to the belt structure, a tread band made of elastomeric material.

The belt structure comprises one or more belt layers, situated in radial superimposition with respect to each other and having textile or metallic reinforcement cords with cross orientation and/or substantially parallel to the circumferential extension direction of the tyre.

Between the carcass structure and the belt structure, a layer of elastomeric material can be provided, termed "under-belt", having the function of making the radially outer surface of the carcass structure as uniform as possible for the subsequent application of the belt structure.

Between the belt structure and the tread band, a so-called "underlayer" can be interposed that is made of elastomeric material with properties suitable for ensuring a stable joining of the tread band to the belt structure.

Respective sidewalls of elastomeric material are applied on the lateral surfaces of the carcass structure, each extended from one of the lateral edges of the tread band up to the respective anchoring annular structure of the beads.

The expression "advancement direction" is used for indicating a direction parallel to the longitudinal direction of a conveyor belt, for feeding or gluing. The feeding direction thus corresponds with the advancement direction of the aforesaid conveyor belt, for feeding or gluing.

The expressions "low", "below", "lower" or "lower part", and "high", "above", "upper" or "upper part" are used for indicating a relative position with respect to the aforesaid conveyor belt, for feeding or gluing.

The expressions "downstream" or "head", and "upstream" or "tail", are used with reference to the aforesaid advancement direction. Therefore, assuming for example an advancement direction from left to right, a position "downstream" or "head" position with respect to any one reference element indicates a position to the right of said reference element and a position "upstream" or "tail" position indicates a position to the left of said reference element.

By "image" or synonymously "digital image" a data set is generally intended, typically contained in a computer file, in which each coordinate (typically two-dimensional) of a finite set (typically two-dimensional matrix, i.e. N lines×M columns) of spatial coordinates (each typically corresponding to a pixel) is associated with a corresponding set of numeric values (which can be representative of magnitudes of different type). For example, in monochromatic images (such as those with greyscale) such set of values coincides with a single value in a finite scale (typically with 256 levels or tones), such value being for example representative of the brightness level (or intensity) of the respective spatial coordinate when displayed, while in the colour images the set of values represents the brightness level of a multiplicity of colours, or channels, typically the primary colours (e.g. red, green and blue in the RGB coding, while cyan, magenta, yellow and black in the CMYK coding). The term 'image' does not necessarily involve the actual display of the same.

BRIEF SUMMARY OF THE INVENTION

In the present description and claims, each reference to a specific "digital image" (for example a two-dimensional digital image initially acquired on a noise reducer element) more generally comprises any one digital image obtainable through one or more digital processing of said specific digital image (such as filtering, equalisation, 'thresholding', morphological transformations—'opening', etc.,—gradient calculations, 'smoothing', etc.).

In the present description and claims, each digital image is considered to comprise a plurality of image units, i.e. autonomously considerable image elements which constitute, overall, the digital image; such image units can each be constituted by one or more pixels. Each image unit corresponds with a respective surface portion, the latter measured for example in mm2, of the noise reducer element.

WO2016/067192 shows a process for applying a noise reducer element to a tyre for vehicle wheels, comprising: a) arranging a noise reducer element; b) arranging an adhesive material; c) guiding said noise reducer element according to a predetermined direction; d) during said guiding action, applying said adhesive material on a first surface of said noise reducer element; e) manipulating said noise reducer element by interacting with at least one second surface of said noise reducer element different from said first surface on which said adhesive material was applied; f) positioning said noise reducer element in a predetermined position on a radially inner surface of said tyre.

EP2554617(A2) describes a method for making a tyre comprising a noise reducer element. The method comprises the steps of: applying an adhesive made of silicone on the internal surface of the liner of the tyre in order to form an adhesively-prepared surface, applying a solid foam noise reducer element to the adhesively-prepared surface, and cross-linking the adhesive.

WO2015/092659 describes a method and an apparatus for controlling production and feeding of semi-finished products in a process for building tyres, said method comprising: detecting at least one first image representative of a semi-finished product wherein said first image is composed of a plurality of first portions, each associated with a respective brightness value; defining a first threshold for said brightness values in a manner such that by arranging a first linear scale of brightness values—defined between a first value corresponding to a zero brightness value and a second value corresponding to a maximum brightness value, in which the absolute value of the difference between said first value and said second value defines a range of said first scale—said first threshold is such that the absolute value of the difference between said first threshold and said first value is comprised between about 5% and about 20% of the range of said first scale; performing a first comparison between the brightness values of said first portions and said first threshold; as a function of said first comparison, determining a first operating parameter representative of an overall area occupied in said first image by the first portions associated with a brightness value smaller than said first threshold; performing a second comparison between said first operating parameter and a second threshold; if said first operating parameter is less than or greater than said second threshold, causing the generation of a first notification signal. WO2015/092659 also describes an apparatus for controlling production and feeding of semi-finished products in a process for building tyres. In other words, WO2015/092659 proposes directing an electromagnetic radiation on a semi-finished product with the shape of a continuous elongated element with flattened cross section, and detecting an image while the semi-finished product is unwound from a reel and moved towards a station for building elementary semi-finished products made by cutting the aforesaid semi-finished product to size.

The Applicant has observed that the adhesive material applied on the noise reducer elements is not always distributed in a uniform manner and such non-uniformity of distribution can determine the presence of areas of the noise reducer elements lacking adhesive or in which there is insufficient adhesive or it is not optimally coupled against the anchoring surface of the noise reducer element.

The Applicant has observed that the lack or scarcity of adhesive in some areas of the noise reducer elements or the imperfect adhesion of the noise reducer elements to the tyre can determine a premature partial or total detachment of such noise reducer elements from the same.

The Applicant therefore perceived the importance of obtaining a correct uniformity of the gluing of the noise reducer element to the tyre.

The Applicant deems it opportune that in the production processes for the tyres provided with noise reducer elements, suitable examinations be performed in order to control the quality of the gluing, ascertaining the correct application of the adhesive.

According to the Applicant, the identification of imperfections in the application of the noise reducer elements already coupled to the tyre is hard to perform, since the attachment interface between the surfaces of each noise reducer element and of the tyre is concealed therebetween.

The Applicant has observed that since it is thus necessary to control each noise reducer element before its application on the tyre, it is rather important to allow such control automatically and reliably by means of a procedure that allows a perfect repeatability of the control itself, without creating bottlenecks within the entire tyre production process.

The Applicant has therefore perceived that the use of electromagnetic radiations could be the optimal solution for meeting the above-described needs.

The Applicant then in particular observed that the use of at least one emission source of an electromagnetic radiation in the direction of a surface of each noise reducer element provided with adhesive (which will consists of the anchoring surface with the tyre) and of at least one device adapted to receive such reflected electromagnetic radiation, can allow an accurate, repeatable, automatic and compatible control with the production cycle time provided for the type of tyres comprising, on the radially inner surface thereof, at least one of said noise reducer elements.

In particular, the Applicant has found that by means of arranging a lighting system by means of electromagnetic radiations and detection thereof on each noise reducer element provided with adhesive it is possible to obtain an image that can be processed in order to verify a suitable gluing. In such a manner, according to the Applicant, it is possible to actuate a predictive control mode suitable for preventing noise reducer elements in which the adhesive is not correctly associated from being applied in the tyre.

More particularly, according to a first aspect, the invention relates to a process for applying noise reducer elements to tyres, wherein each noise reducer element comprises an anchoring surface coated with an adhesive layer.

Preferably, it is provided to illuminate said anchoring surface coated with said adhesive layer with a reference radiation.

Preferably, it is provided to detect a radiation emitted by the anchoring surface illuminated by the reference radiation.

Preferably, as a function of said emitted radiation it is provided to determine a digital image representative of the anchoring surface coated with said adhesive layer, each pixel of the digital image being associated with a respective brightness value representative of the quantity of adhesive present in an area of said anchoring surface corresponding to said each pixel.

Preferably it is provided to calculate, as a function of the brightness values, at least one first parameter representative of the overall distribution of said adhesive layer on the anchoring surface.

Preferably it is provided to perform a comparison between a value of said at least one first parameter and at least one reference value representative of a correct distribution of said adhesive layer on the anchoring surface.

Preferably, based on said comparison it is provided to apply, on the radially inner surface of a tyre, or direct along a discard path, one or more noise reducer elements.

The Applicant deems that according to such solution, the production discards can be limited to only the defective noise reducer elements, avoiding the discard of the entire tyre.

The Applicant also deems that the gluing of the non-discarded reducer elements of the tyre is thus always according to specification, and therefore a separation from the tyre itself is avoided notwithstanding the stresses imparted during operation, even at high use speeds.

Typically, said radiation emitted by the anchoring surface illuminated by the reference radiation is a reflected radiation, though it may also be a diffused radiation and/or re-emitted following at least partial absorption of the aforesaid reference radiation.

In a second aspect, the invention relates to an apparatus for applying noise reducer elements to tyres, wherein each noise reducer element comprises an anchoring surface coated with an adhesive layer.

Preferably, a lighting device is provided, configured for illuminating said anchoring surface with a reference radiation.

Preferably a detection device is provided, configured for detecting a radiation emitted by the anchoring surface illuminated by the reference radiation.

Preferably, as a function of said emitted radiation, said detection device is configured for determining a digital image, representative of the anchoring surface coated with said adhesive layer, each pixel of the digital image being associated with a respective brightness value representative of the quantity of adhesive present in an area of said anchoring surface corresponding to said each pixel.

Preferably a processing unit is provided, configured for calculating as a function of the brightness values at least one first parameter representative of the overall distribution of said adhesive layer on the anchoring surface.

Preferably a processing unit is provided, configured for performing a comparison between a value of said at least one first parameter and at least one reference value representative of a correct distribution of said adhesive layer on the anchoring surface.

Preferably, based on said comparison, a processing unit is provided, configured for controlling the activation of an application device for applying, on the radially inner surface of a tyre, one or more noise reducer elements or controlling a directing along a discard path of one or more noise reducer elements.

In one or more of the aforesaid aspects, the invention can also comprise one or more of the following preferred characteristics.

Preferably, it is provided that said illuminating action takes place at a reading window.

Preferably, it is provided to position said noise reducer element with its own anchoring surface resting against a first transport surface movable according to a predetermined advancement direction.

Preferably, it is provided to transfer the noise reducer element from the first transport surface to a second transport surface movable according to the advancement direction consecutively to the first transport surface.

Preferably, it is provided that said illuminating action takes place during said transferring action.

Preferably, it is provided that said reading window is defined between the first transport surface and the second transport surface.

Preferably, it is provided that said digital image comprises a plurality of image units and the action of comparing the value of said at least one first parameter with said at least one reference value is performed for each image unit.

Preferably, it is provided that said digital image comprises a plurality of image units and said comparison is performed as a function of an acceptability threshold.

Preferably, said acceptability threshold comprises an absolute acceptability parameter defined by a predetermined number of image units for which the value of said at least one first parameter does not conform to said at least one reference value.

Preferably, said acceptability threshold comprises a relative acceptability parameter defined by a predetermined percentage of image units for which the value of said at least one first parameter does not conform to said at least one reference value, with respect to the total number of image units of said digital image.

Preferably, said acceptability threshold comprises an aggregative acceptability parameter defined by a predetermined quantity of image units that are respectively adjacent, for which the value of said at least one first parameter does not conform to said at least one reference value.

Preferably, the action of determining a digital image is carried out by generating, during the transfer of each noise reducer element, a plurality of frames each representative of a portion of the anchoring surface.

Preferably, the action of determining a digital image is repeated at a frequency defined as a function of the ratio of a transfer speed of the noise reducer element along the advancement direction to a longitudinal dimension of the reading window in the advancement direction.

Preferably, a screen is provided, which is arranged adjacent to said reading window, which when illuminated by the reference radiation, emits a background radiation whose acquisition is discriminable with respect to the radiation emitted by the anchoring surface.

Preferably, it is provided to detect the background radiation emitted by said screen, together with the radiation emitted by the anchoring surface, discriminating in said digital image a first portion representative of the anchoring surface and a second portion representative of the screen.

Preferably, the action is provided, in detecting the amount of image units for which the value of said at least one first parameter does not conform to said at least one reference value, for excluding the image units of the second portion representative of the screen.

Preferably, it is provided to detect an alignment between a front edge of the noise reducer element and a rear edge of the reading window.

Preferably, it is provided to synchronise said action of determining a digital image with the transferring of the noise reducer element, as a function of the detected alignment.

Preferably, said lighting device works at a reading window.

Preferably, at least one first transport surface and one second transport surface are provided, arranged consecutively.

Preferably, a positioning group is provided, configured for positioning said noise reducer elements consecutively one after the other each with its own anchoring surface resting against said first transport surface.

Preferably, movement devices are provided, configured for transferring each noise reducer element from the first transport surface to the second transport surface according to an advancement direction.

Preferably, said lighting device is configured for illuminating said anchoring surface from an underlying position with respect to said first transport surface and second transport surface at the reading window.

Preferably, in the advancement direction, the reading window has a longitudinal dimension smaller than a longitudinal dimension of each noise reducer element.

Preferably, said detection device is configured for generating a plurality of frames each representative of a portion of the anchoring surface, determining said digital image during the transfer of each noise reducer element by the movement devices.

Preferably, a screen is provided adjacent to the reading window, such screen configured for emitting a background radiation discriminable from the detection of the radiation emitted by the anchoring surface, when reached by the reference radiation.

Preferably, the reading window is interposed between said screen and said lighting device.

Preferably, said screen is configured for receiving the reference radiation through the reading window.

Preferably, said screen is configured for emitting a background radiation discriminable from the detection of the radiation emitted by the anchoring surface when it is illuminated by the reference radiation.

Preferably, said processing unit is configured for excluding image units of the portion representative of the screen in detecting the amount of image units for which the value of said at least one first parameter does not conform to said at least one reference value.

Preferably, the reference radiation is an infrared radiation having wavelength comprised between about 850 nm and about 1050 nm.

Further characteristics and advantages will be clearer from the detailed description of a preferred and non-exclusive embodiment of the invention.

BRIEF DESCRIPTION OF THE SEVERAL VIEW OF THE DRAWINGS

Figure 2:
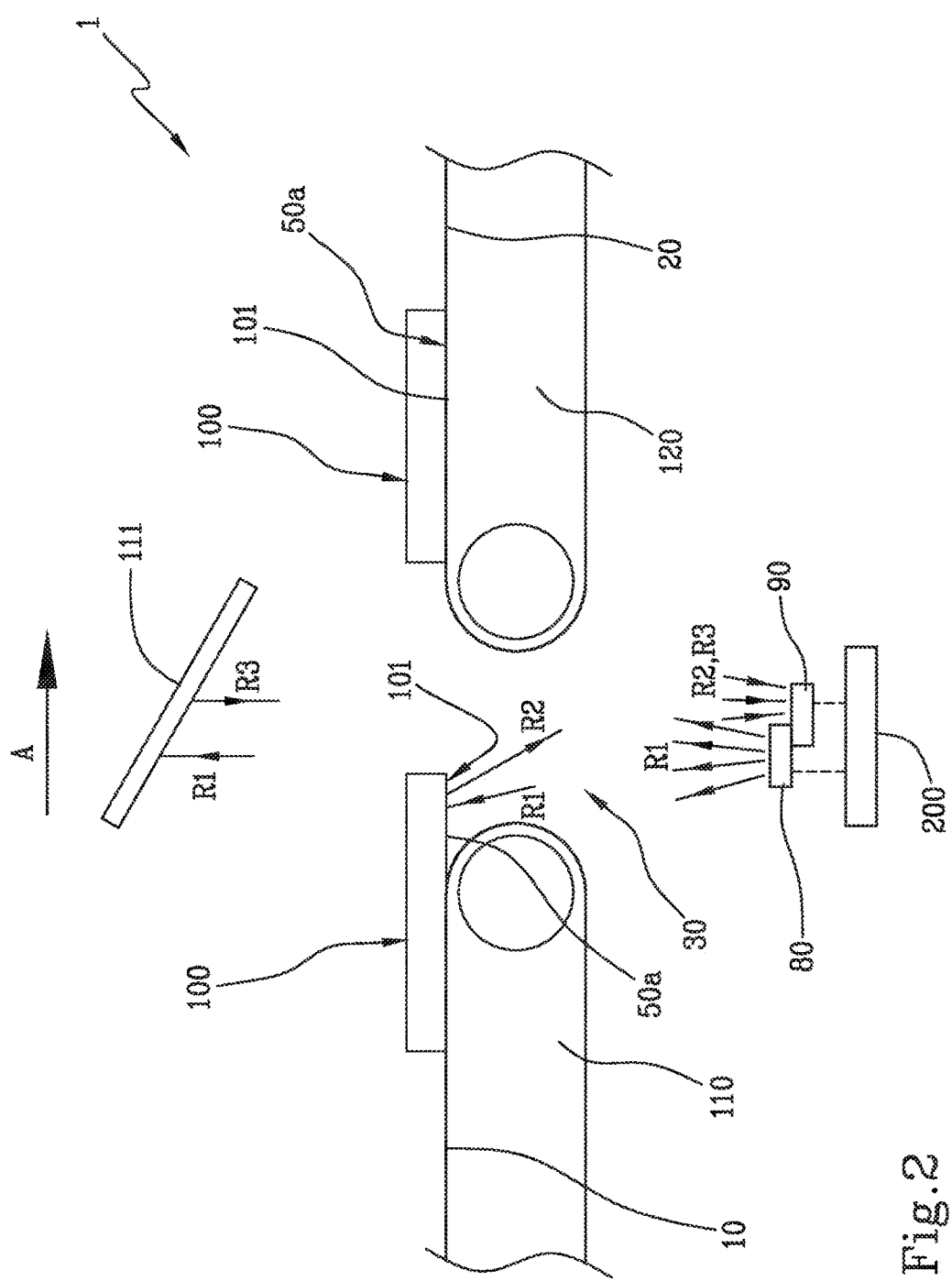
Figure 3:
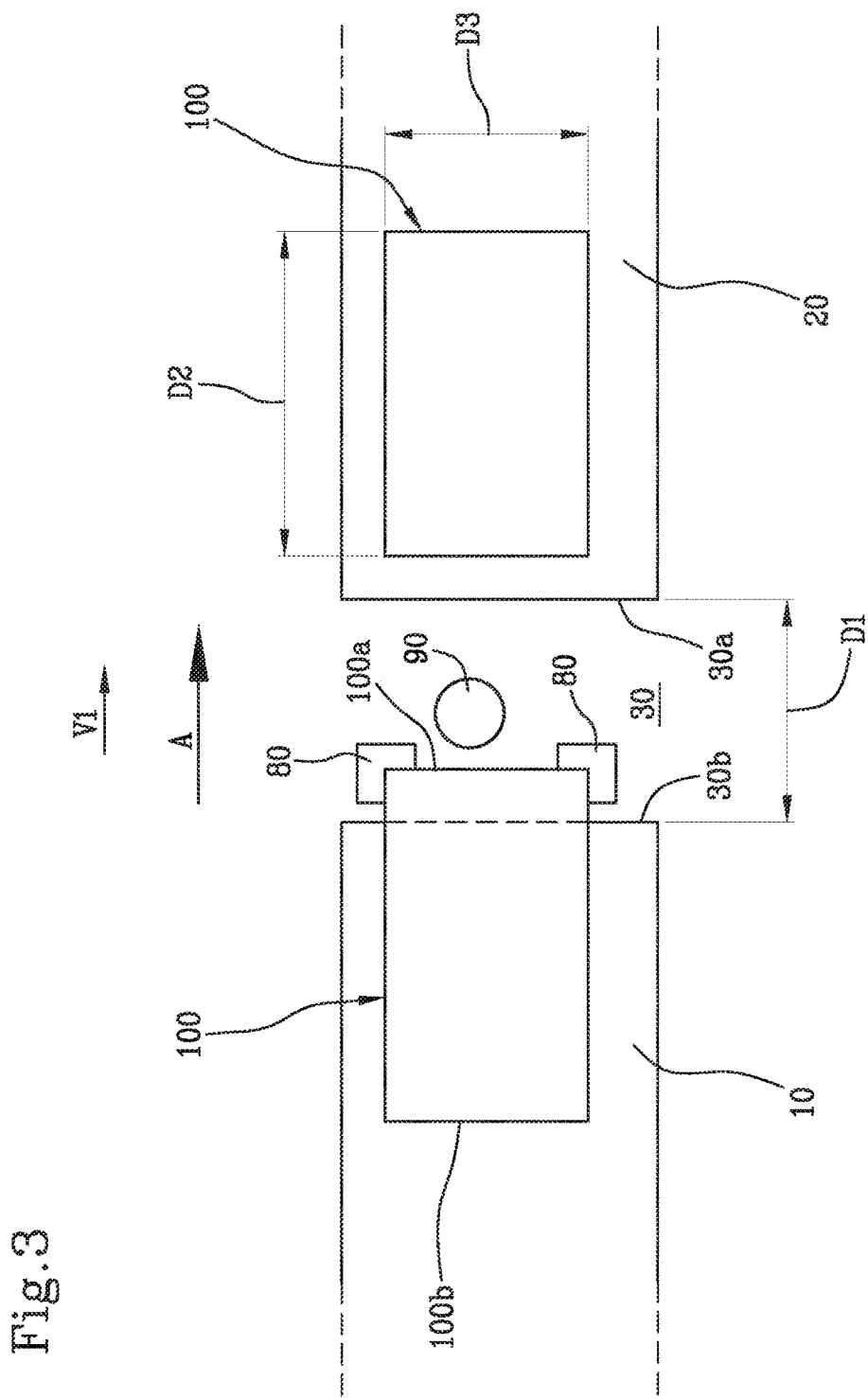
Figure 4:
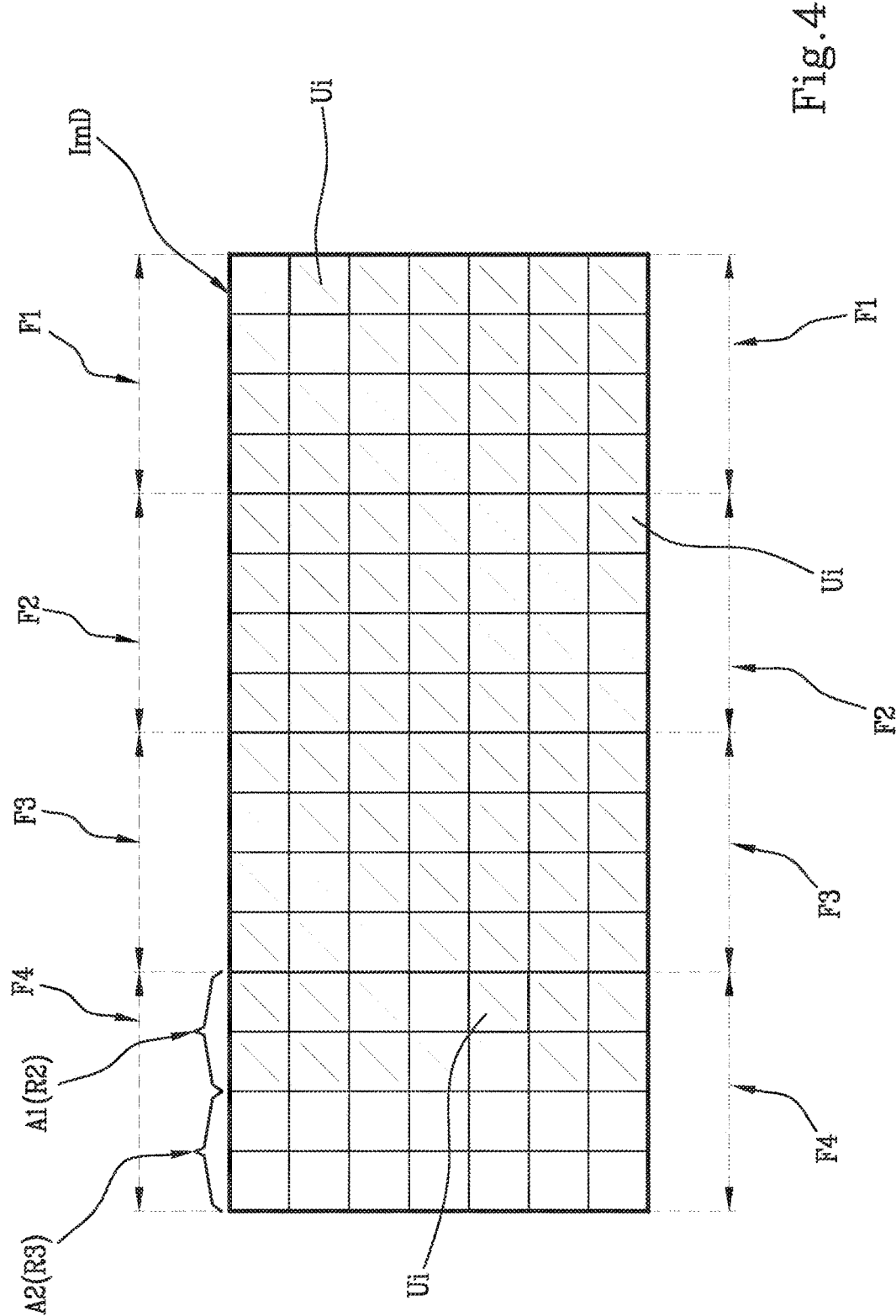
Figure 5:
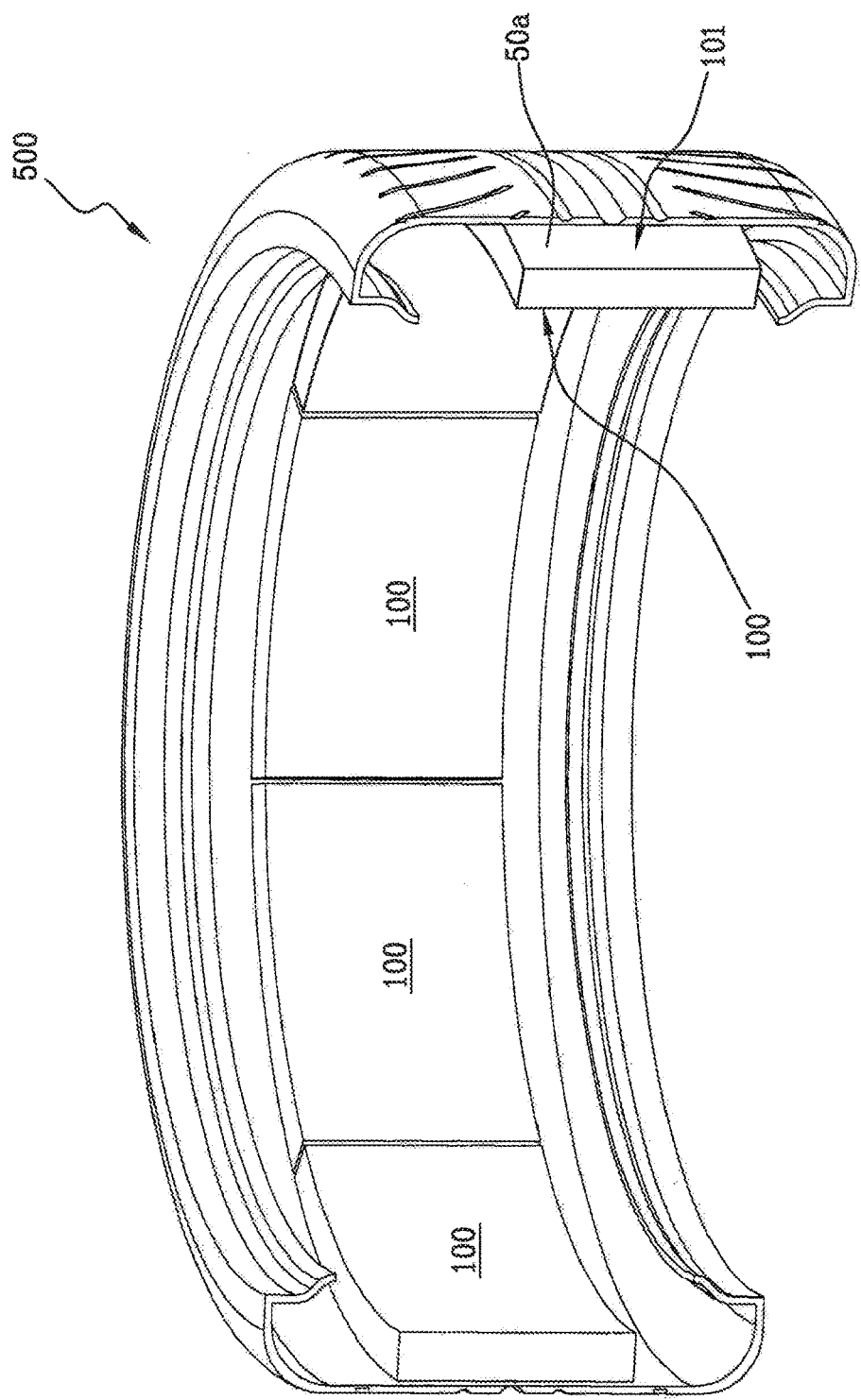

Such description is provided hereinbelow with reference to the enclosed figures, also having merely exemplifying and hence non-limiting purpose, in which:

FIG. 1 schematically shows a part of a plant for producing tyres in which an apparatus is inserted in accordance with the present invention;

FIG. 2 schematically shows, in side view, a detail of a part of the apparatus of FIG. 1;

FIG. 3 schematically shows the detail of FIG. 2 seen from above;

FIG. 4 schematically shows an exemplifying image used in the apparatus and in the method according to the invention;

FIG. 5 shows, in an interrupted perspective view, a tyre provided with noise reducer elements.

DETAILED DESCRIPTION OF THE INVENTION

With reference to the enclosed figures, reference number 1 overall indicates an apparatus for applying noise reducer elements to tyres for vehicle wheels.

The apparatus is used for applying noise reducer elements 100.

As shown in particular in FIG. 1, a noise reducer element 100 comprises a block with parallelepiped form having an anchoring surface 101 coated with an adhesive layer 50a.

The noise reducer element 100 is made of spongy material, preferably made of polyurethane foam.

The presence of the adhesive layer 50a on the anchoring surface 101 confers to the latter different optical characteristics (e.g. reflectivity and/or refractivity) with respect to the remaining surfaces lacking adhesive layer 50a.

The apparatus 1 comprises a positioning group 2 through which the noise reducer elements 100 are picked up by a suitable tank or by another feeding unit, in order to receive, as better illustrated hereinbelow, said adhesive layer 50a on the anchoring surface 101 and be transferred consecutively one after the other, each with its own anchoring surface 101 resting against a first transport surface 10.

Preferably, the anchoring surface 101 and the first transport surface 10 are respectively directed downward and upward.

In a preferred embodiment, the first transport surface 10 is defined on an upper branch of a first conveyor belt 110.

The apparatus 1 also comprises at least one second transport surface 20 consecutive to the first transport surface 10, preferably aligned and coplanar with respect thereto.

The second transport surface 20 is preferably defined on an upper branch of a second conveyor belt 120, consecutive and preferably aligned with respect to the first conveyor belt 110.

The first transport surface 10 and the second transport surface 20 are movable according to a predetermined advancement direction A, preferably at a same predetermined linear speed.

The assembly of the first conveyor belt 110 and second conveyor belt 120 defines movement devices configured for transferring each noise reducer element 100 from the first transport surface 10 to the second transport surface 20 according to the advancement direction A.

In the illustrated example, the positioning group 2 comprises a robotic arm 40 associated with a feeding belt 130 controlled by a gluing belt 140, situated upstream of the first conveyor belt 110.

The robotic arm 40, e.g. of aerial type, bears a gripping member 42 suitable for sequentially picking up the noise reducer elements 100 in order to deposit them on the feeding belt 130. The feeding belt 130 transfers the noise reducer elements 100 to the gluing belt 140. A continuous strip-like support 50, on which an adhesive coating 50a is arranged, is picked up by a feeding reel 51 and wound on a collection reel 52, upon passage along an upper surface of the gluing belt 140. Consequently, each of the noise reducer elements 100 transferred on the gluing belt 140 receives the respective adhesive layer 50a, picked up from the continuous strip-like support 50 at the upper surface of the gluing belt itself 140. A pressing element 60 can be used for facilitating the transfer of the adhesive material 50a due to pressing action exerted on the noise reducer elements 100 in the direction of the gluing belt 140.

A cutting element 70 movable alternatively between the gluing belt 140 and the first conveyor belt 110 can be arranged for cutting the adhesive material 50a and facilitating the mutual separation of the noise reducer elements 100 which transit towards the first conveyor belt 110.

With particular reference to FIGS. 1 to 3, the apparatus 1 comprises a reading window 30 preferably defined between the first transport surface 10 and the second transport surface 20.

With reference to FIG. 3, in the advancement direction A, the reading window 30 has a longitudinal dimension D1 delimited between a front edge 30a and a rear edge 30b. The front edge 30a and the rear edge 30b can be respectively defined by the mutually opposite ends of the first conveyor belt 110 and of the second conveyor belt 120.

Preferably, the longitudinal dimension D1 is smaller than a longitudinal dimension D2 of each noise reducer element 100.

In one embodiment of the invention, the reading window has longitudinal dimension D1 comprised between about 30 mm and about 50 mm, preferably of about 40 mm and the longitudinal dimension D2 of the noise reducer element 100 is comprised between about 40 mm and about 250 mm.

The size of the area to be controlled, delimited by the reading window 30, varies as a function of the occupation of the window 30 by the noise reducer element 100.

More particularly, the area delimited reading window 30 varies as a function of the fixed longitudinal dimension D1 and of a transverse dimension D3 of the noise reducer element, variable in accordance with the width presented by the noise reducer elements belonging to a specific work batch.

The apparatus 1 comprises at least one lighting device 80, operating through the reading window 30, and configured for illuminating with a reference radiation R1 the anchoring surface 101 of each noise reducer element 100 which transits from the first transport surface 10 to the second transport surface 20.

It is provided to illuminate the anchoring surface 101, coated with the adhesive layer 50a, through the reading window 30, with the reference radiation R1 and during the transfer from the first transport surface 10 to the second transport surface 20.

In one embodiment, the lighting device 80 is configured for illuminating the anchoring surface 101 from an underlying position with respect to the first transport surface 10 and to the second transport surface 20, through the reading window 30.

Preferably, the lighting device 80 comprises at least one lamp with infrared emission.

Preferably, the reference radiation is infrared radiation having wavelength comprised between about 850 nm and about 1050 nm.

Since the coating of the noise reducer element 100 with an adhesive layer involves a variation of the optical characteristics of the anchoring surface, it is possible to determine the correct application of the adhesive layer by detecting a radiation emitted by the noise reducer element 100 following the illuminating of the anchoring surface 101.

With particular reference to FIG. 2, the apparatus 1 comprises a detection device 90 configured for detecting the radiation R2 emitted by the anchoring surface 101 illuminated by the reference radiation R1.

With particular reference to FIG. 4, the detection device 90 is also configured for determining a digital image ImD as a function of the emitted radiation R2; the digital image ImD is representative of the anchoring surface 101 coated with the adhesive layer 50a, each pixel of the digital image ImD being associated with a respective brightness value representative of the quantity of adhesive present in an area of said anchoring surface corresponding to said pixel.

Preferably, the digital image ImD comprises a plurality of image units Ui, each representing one or more pixels corresponding to an area of the anchoring surface 101 measured preferably in mm2.

With particular reference to FIG. 3, the detection device 90 is configured for detecting an alignment between a front edge 100a of the noise reducer element 100 and a rear edge 30b of the reading window 30.

The detection device 90 is also configured for synchronising the determination of a digital image ImD with the transfer of the noise reducer element 100, as a function of said alignment.

More in detail, with particular reference to FIG. 3, the detection device 90 is configured for determining the digital image ImD during the transfer of each noise reducer element 100 by the movement devices and generating a plurality of frames Fi (F1, F2, F3 and F4 in FIG. 4) each representative of a portion of the anchoring surface 101.

Preferably, the total number N tot of the image units Ui of the digital image ImD corresponds with the sum of the image units Ui representative of the anchoring surface 101 in the single frames Fi.

The detection device 90 is configured for predetermining the number of frames Fi generated for each noise reducer element 100, as a function of the longitudinal dimension D2 of the noise reducer element 100.

In particular, the number of frames Fi generated for each noise reducer element 100 corresponds with the ratio of the longitudinal dimension D2 of the noise reducer element 100 to the longitudinal dimension D1 of the reading window 30 in the advancement direction A, rounded up to the next whole number.

The detection device 90 is also configured for determining the digital image ImD repeatedly, at a frequency f defined as a function of the ratio of a transfer speed V1 along the advancement direction A, imposed on the noise reducer element 100 upon action of the movement devices, to a longitudinal dimension D1 of the reading window 30 in the advancement direction A.

The detection device 90, after having detected the radiation R2 emitted by the anchoring surface 101 illuminated by the reference radiation R1, determines, as a function of said emitted radiation R2, said digital image ImD representative of the anchoring surface 101 coated with said adhesive layer 50a.

The emitted radiation R2 is variable as a function of the actual adhesion of the adhesive layer 50a distributed on the anchoring surface 101.

The processing unit 200 (FIGS. 1 and 2) is configured for calculating as a function of the brightness values at least one first parameter P representative of the overall distribution of said adhesive layer 50a on the anchoring surface 101. Subsequently, the processing unit 200 performs a comparison between a value VP of said at least one first parameter P and at least one reference value Vrif representative of a correct distribution of said adhesive layer 50a on the anchoring surface 101.

The value VP of said at least one first parameter P and its comparison with at least one reference value Vrif, performed for each pixel or image unit Ui, thus allows identifying the presence of zones of the anchoring surface 101 in which there is no correct adhesion of the adhesive layer 50a.

With particular reference to FIG. 1, the processing unit 200 is also configured for controlling based on said comparison the activation of an application device 180, operating downstream of the reading window 30, in order to apply on the radially inner surface of said tyre 500 one or more noise reducer elements 100.

The application device 180 can be structurally analogous to the robotic arm 40, and selectively applies the noise reducer elements 100 in whose digital image ImD the comparison between the value VP of said at least one first parameter P and at least one reference value Vrif, as a function of an acceptability threshold Th, is positive, i.e. when the adhesive layer 50a is correctly distributed on the anchoring surface 101.

If the comparison between the value VP of said at least one first parameter P and at least one reference value Vrif, as a function of said acceptability threshold Th, is negative, i.e. when the adhesive layer 50a is lacking or not correctly distributed on the anchoring surface 101, the processing unit 200 is configured for controlling, downstream of the reading window 30, the directing of the noise reducer elements 100 along a discard path.

In the depicted example, the discard path leads to a collection container 300, and in such case the noise reducer elements 100 pass beyond a terminal end of the second conveyor belt 120 without being picked up by the application device 180.

The comparison between the value VP of said at least one first parameter P and at least one reference value Vrif is carried out for each pixel or unit of image Ui.

In a first embodiment, the acceptability threshold Th comprises an absolute acceptability parameter Th1 defined by a predetermined number N1 of image units Ui for which the value VP of said at least one first parameter P does not conform to said at least one reference value Vrif.

It may be provided that the absolute acceptability parameter Th1 corresponds with the sum of the image units Ui for which the value VP of said at least one first parameter P does not conform to said at least one reference value Vrif in each single frame Fi or, alternatively, in the sum of the frames which compose the digital image ImD.

In a second embodiment, the acceptability threshold Th comprises a relative acceptability parameter Th2 defined by a predetermined percentage P1 of image units Ui for which the value VP of said at least one first parameter P does not conform to said at least one reference value Vrif, with respect to the total number N_tot of image units Ui of said digital image ImD.

It may be provided that the relative acceptability parameter Th2 corresponds with the percentage of the sum of the image units Ui for which the value VP of said at least one first parameter P does not conform to said at least one reference value Vrif in each single frame Fi, with respect to the total number N_tot of image units Ui of the digital image ImD.

In a third embodiment, the acceptability threshold Th comprises an aggregative acceptability parameter Th3 defined by a predetermined quantity Q1 of image units Ui that are respectively adjacent, for which the value VP of said at least one first parameter P does not conform to said at least one reference value Vrif.

Preferably, the predetermined quantity Q1 of image units Ui, which are respectively adjacent defining the third acceptability threshold Th3, is lower than the predetermined number N1 of image units Ui defining the first acceptability threshold Th1.

In other words, it can be provided that a lower but concentrated number of detected defects can refer to a more stringent acceptability threshold.

It can be provided that the aggregative acceptability parameter Th3 corresponds with the sum of the image units Ui that are respectively adjacent, for which the value VP of said at least one first parameter P does not conform to said at least one reference value Vrif in two or more respectively consecutive frames.

With particular reference to FIGS. 1 and 2, the apparatus comprises a screen 111, adjacent to the reading window 30.

In particular, the reading window 30 is preferably interposed between the screen 111 and the lighting device 80.

The screen 111 is configured for receiving the reference radiation R1 through the reading window 30.

When it is reached by the reference radiation R1, it is provided that the screen 111 emits a background radiation R3 whose acquisition is discriminable with respect to the radiation R2 emitted by the anchoring surface 101.

With particular reference to FIG. 4, the detection device 90 is configured for detecting the background radiation R3, emitted by the screen 111, together with the radiation R2 emitted by the anchoring surface 101, and for discriminating in the digital image ImD a first portion A1 representative of the anchoring surface 101 and a second portion A2 representative of the screen 111.

With particular reference to FIG. 4, the processing unit 200 is configured for excluding the image units Ui of the second portion A2 representative of the screen 111, for the purpose of the detection of the amount of image units Ui for which the value VP of said at least one first parameter P does not conform to said at least one reference value Vrif.

In one embodiment of the process according to the invention, the following were considered:
- the pixel brightness value equal to 0 in case of total absence of adhesive on the noise reducer element and comprised between 50 and 255 for a sufficient presence thereof (i.e. Vrif≥50);
- an area smaller than 100 mm2 relative to those portions of the anchoring surface of the noise reducer element on which the adhesive is not correctly distributed, i.e. such that the corresponding pixels thereof have brightness value lower than 50, the threshold for the acceptability of the noise reducer element itself (threshold Th).

According to the aforesaid embodiment, a noise reducer element 100 with 120 mm×220 mm size having its own anchoring surface 101, on which the adhesive layer 50a has been applied, was transferred according to the advancement direction A from the first transport surface 10 to the second transport surface 20.

Illuminated by the radiation R1, having wavelength equal to about 900 nm, the digital image ImD obtained according to the illustrated process showed two surface portions, respectively of about 49.7 mm2 and 29.7 mm2, in which the distribution of the adhesive was scarce or absent, i.e. brightness values lower than 50 of the corresponding pixels (generating the first parameter P each time compared with Vrif), identified, on the anchoring surface, a corresponding overall surface portion of 79.4 mm2.

The noise reducer element was thus deemed acceptable and was applied inside a tyre.

The invention claimed is:

1. An apparatus for applying noise reducer elements to tyres, wherein each noise reducer element comprises an anchoring surface coated with an adhesive layer, the apparatus comprising:
  i) a lamp, configured for illuminating said anchoring surface with a reference radiation;
  ii) a detection device configured for:
  detecting a radiation emitted by the anchoring surface illuminated by the reference radiation and, as a function of said emitted radiation,
  determining a digital image representative of the anchoring surface coated with said adhesive layer, each pixel of the digital image being associated with a respective brightness value representative of an amount of adhesive present in an area of said anchoring surface corresponding to said each pixel; and
  iii) a processing unit configured for:
  calculating, as a function of the brightness values, at least one first parameter representative of an overall distribution of said adhesive layer on the anchoring surface,
  performing a comparison between a value of said at least one first parameter and at least one reference value representative of a correct distribution of said adhesive layer on the anchoring surface; and, based on said comparison:
  either controlling activation of an application device for applying on the radially inner surface of a tyre one or more noise reducer elements, or
  controlling a conveying along a discard path of one or more of noise reducer elements.

2. The apparatus as claimed in claim 1, wherein said lamp operates at a reading window.

3. The apparatus as claimed in claim 1, comprising at least one first transport surface and one second transport surface arranged consecutively.

4. The apparatus as claimed in claim 3, comprising a controllable feeding belt configured for positioning said noise reducer elements consecutively one after the other, each with its own anchoring surface resting against said first transport surface.

5. The apparatus as claimed in claim 3, comprising conveyor belts configured for transferring each noise reducer element from the first transport surface to the second transport surface according to an advancement direction.

6. The apparatus as claimed in claim 3, wherein the reading window is defined between the first transport surface and the second transport surface.

7. The apparatus as claimed in claim 6, wherein said lamp is configured for illuminating said anchoring surface from an underlying position with respect to said first transport surface and second transport surface at the reading window.

8. The apparatus as claimed in claim 5, wherein, in the advancement direction, the reading window has a longitudinal dimension smaller than a longitudinal dimension of each noise reducer element.

9. The apparatus as claimed in claim 5, wherein said detection device is configured for generating a plurality of frames, each frame being representative of a portion of the anchoring surface, determining said digital image during the transfer of each noise reducer element by the conveyor belts.

10. The apparatus as claimed in claim 2, further comprising, adjacent to the reading window, a screen configured for emitting a background radiation discriminable from the detection of the radiation emitted by the anchoring surface, when reached by the reference radiation.

11. The apparatus as claimed in claim 10, wherein the reading window is interposed between said screen and said lamp.

12. The apparatus as claimed in claim 10, wherein said screen is configured for receiving the reference radiation through the reading window.

13. The apparatus as claimed in claim 10, wherein said screen is configured for emitting a background radiation discriminable from the detection of the radiation emitted by the anchoring surface when the anchoring surface is illuminated by the reference radiation.

14. The apparatus as claimed in claim 10, wherein said processing unit is configured for excluding image units of a representative portion of the screen in detecting a quantity of image units for which the value of said at least one first parameter does not conform to said at least one reference value.

* * * * *